July 6, 1965
F. MINECK
3,193,640
AIR STREAM ACTUATED LIMIT SWITCH
Filed April 16, 1962
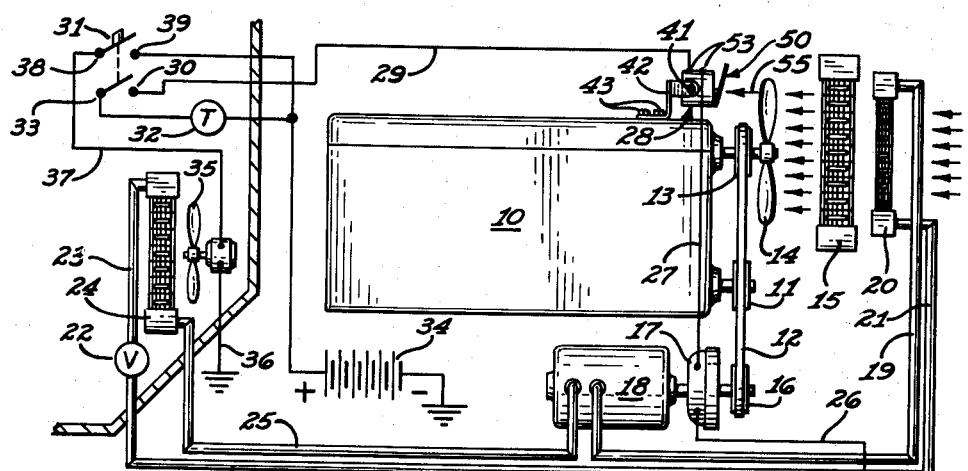
Fig. 1
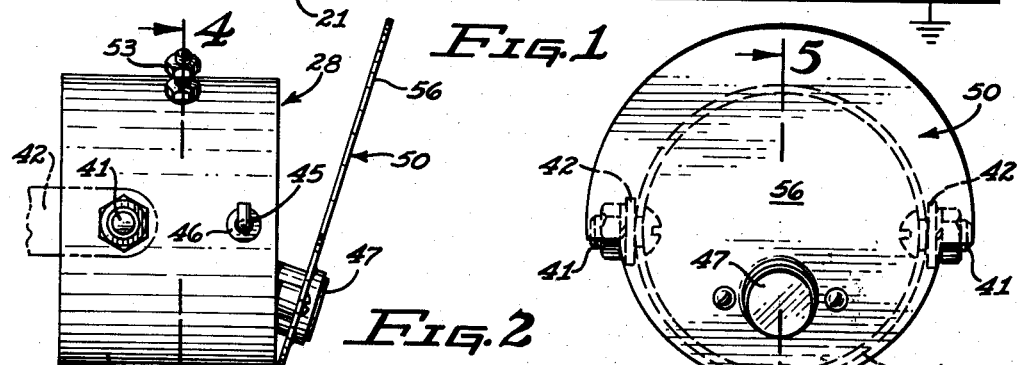
Fig. 2
Fig. 3
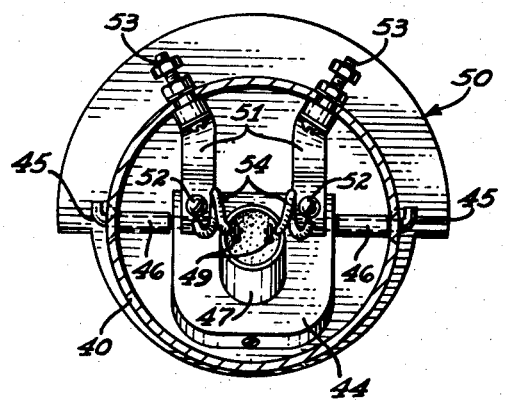
Fig. 4
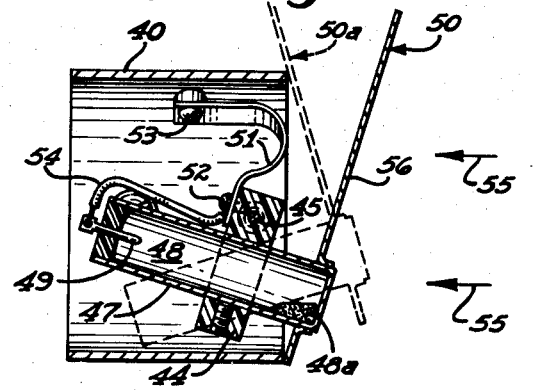
Fig. 5
INVENTOR.
FRED MINECK.
BY Willard S. Grove
ATTORNEY.

United States Patent Office 3,193,640
Patented July 6, 1965

3,193,640
AIR STREAM ACTUATED LIMIT SWITCH
Fred Mineck, Phoenix, Ariz., assignor to
Jack G. Firestone, Ontario, Calif.
Filed Apr. 16, 1962, Ser. No. 187,682
1 Claim. (Cl. 200—81.9)

This invention pertains to an air stream actuated limit switch and is particularly directed to a control switch for idle compressor control for automobiles equipped with refrigeration cooling systems.

One of the objects of this invention is to provide a control limit switch to cut out the refrigeration compressor whenever the engine drops to normal idlying speed.

Another object of this invention is to provide a control switch incorporating a mercoid contact tube actuated from an air stream having a high degree of sensitivity.

A further object is to provide a control device for a refrigeration compressor of an automobile refrigeration system which automatically disconnects the compressor from the vehicle engine during the cranking and initial starting of the engine so as to relieve its load from the starting motor and battery while starting the engine.

A further object is to provide a highly sensitive air stream actuated limit switch particularly adapted to automotive applications which is simple to install and not critical as to location and adjustment on the vehicle.

Another object is to provide a control switch for automotive refrigeration compressor which functions during sudden stops or sudden deceleration at the lower speeds to disconnect the magnetic clutch of the refrigeration compressor.

An object is also to have an air gate valve that is carefully designed and balanced to actuate its mercury switch to off position on steep hills and up grades to automatically relieve engine load under these conditions.

The control switch of this invention is also constructed so as to operate in dust, water and bug conditions without failure, the actuating gate member being so arranged to shield the entire unit and deflect any foreign matter from effecting the switch mechanism.

Further features and advantages of this invention will appear from a detailed description of the drawings in which:

FIG. 1 is a diagram showing the air stream actuated limit switch incorporating the features of this invention applied to a motor vehicle having a refrigeration system.

FIG. 2 is an enlarged side elevation of the air stream actuated limit switch.

FIG. 3 is an enlarged front elevation of the switch shown in FIG. 2.

FIG. 4 is a sectional view on the line 4—4 of FIG. 2.

FIG. 5 is a sectional view on the line 5—5 of FIG. 3.

As an example of one embodiment of this invention, there is shown in FIG. 1 a motor vehicle having an engine 10 having the usual crankshaft pulley 11 adapted to drive the belt 12 operating over the fan pulley 13 of the radiator cooling fan 14 for the engine cooling radiator 15. The belt 12 also operates over and drives the refrigeration compressor pulley 16 connected to the electrically operated magnetic clutch 17 connected to drive or release power to the refrigeration compressor 18. The pressure discharge line 19 from the refrigeration compressor is connected to the usual condenser 20 located in front of the radiator 15 and a line 21 from the condenser 20 is connected to a suitable expansion valve 22 in turn connected through the line 23 to the evaporator cooling coil 24 located in the passenger compartment of the vehicle. The return line 25 from the evaporator 24 is connected to the suction side of the compressor 18.

The magnetic clutch 17 has one terminal grounded through a lead 26 and its other terminal connected through a lead 27 to one terminal of the air stream actuated limit switch 28 of this invention. The other terminal of the switch 28 is connected through lead 29 to terminal 30 of the refrigeration control switch 31. A temperature sensitive thermostatic control switch 32 in the passenger compartment is interconnected between the terminal 33 of the switch 31 and the hot side of the battery 34. The cooling air circulating fan 35 for the evaporator has one terminal grounded through lead 36 and its other terminal connected through lead 37 to terminal 38 of the switch 31. The terminal 39 of switch 31 is connected to the hot side of the battery 34. When switch 31 is closed the circuit to the magnetic clutch 17 and switch 28 and the circuit for the cooling air circulating fan are closed. Opening switch 31 deenergizes these circuits.

The air stream actuated limit switch 28 comprises a cylindrical body member 40 having a mounting bolt 41 which secures the switch to the mounting strap 42 which is bolted at 43 to the engine 10 or other suitable portion of the motor vehicle. A pivot block 44 is mounted on a rockshaft 45 pivotally mounted in suitable bearings 46 in the body member 40. A mercury switch tube 47 of conventional design having an evacuated chamber 48 containing a bubble of mercury 48a and a pair of electrical contacts 49 in the rear end of the tube 47 is fixed intermediate its ends in pivot block 44.

A disc 50 is rigidly fixed to the front end of the tube 47 or otherwise suitably connected to the pivot block 44 so as to normally hold the tube in the downwardly forwardly tipped position, shown in full line in FIG. 5, with the circuit between the contacts 49 broken and the switch thus open. Suitable flexible connecting leads 51 between the terminals 52 on the pivot block 44 and the terminals 53 fixed in insulated condition on the body 40 so as not to restrict the free pivotal movement of the pivot block, tube 47 and disc 50. Suitable connecting wires 54 are provided between the terminals 52 and the contacts 49 in the tube 47.

The above described switch 28 is suitably mounted so that the air stream indicated by the arrows 55 delivered by the radiator cooling fan is directed against the front face 56 of the disc 50. When a certain air velocity 55 is reached when the engine 10 is accelerated above idling speed, air blast against the disc surface 56 causes the unit 44–47–50 to tilt back to the broken line position 50a so that the mercury 48 closes the contacts 49 to thus complete the circuit for energizing the magnetic clutch 17 (with switch 31 closed). Whenever the engine drops back to idling speed the switch returns to open full line position 50 deenergizing the magnetic clutch to thus remove the refrigeration load from the engine during idling and thus prevent rough idling and overheating of the engine.

Further, the arrangement of the elements 44–47–50 is such that when the vehicle is climbing a very steep grade of 18% or greater causing the switch body 40 to tilt backwardly with the vehicle, the switch will still maintain the open position with slow hard pull or idling speeds of the engine 10. These elements 44–47–50 are further designed to deenergize the magnetic clutch during very sudden stops or rapid deceleration at the lower speeds to prevent stalling the engine under these conditions.

It is important to note that the peripheral extent of the disc 50 is preferably greater than the cylindrical body 40 so that contaminated air delivered by the fan 14 is diverted from the interior mechanism of the body 40 so that the switch is unaffected by dust, water and bugs coming in through the radiator 15 of the vehicle.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claim are intended to be included herein.

Having thus fully set forth and described this invention what is claimed and desired to be obtained by United States Letters Patent is:

The combination in an air flow operated switch of:
(a) a hollow cylindrical body rigidly fixed to a support,
(b) a pivot block pivotally mounted within the hollow interior of said body,
(c) a mercury switch tube fixed to said pivot block within said body,
(d) a wind actuated disc of larger diameter than the outside diameter of said body fixed to said pivot block and located over the front opening of said body and so located as to receive a flow of air,
(e) and means for connecting said mercury switch tube in a circuit so that increased air speed from said fan tilts said disc and pivot block to actuate said mercury switch to close said circuit.

References Cited by the Examiner
UNITED STATES PATENTS

| | | | |
|---|---|---|---|
| 1,968,648 | 7/34 | Kendall | 200—81.9 |
| 2,180,896 | 11/39 | Claytor | 290—7 |
| 2,240,595 | 5/41 | White | 200—81.9 |
| 2,348,950 | 5/44 | Anderson | 236—45 |
| 2,526,315 | 10/50 | Allen et al. | 165—83 |
| 2,631,023 | 3/53 | Bailey | 261—30 |
| 2,761,494 | 9/56 | Field | 158—1 |
| 2,787,129 | 4/57 | Evans | 62—228 |
| 2,819,845 | 1/58 | Ziph | 236—45 |
| 2,895,308 | 7/59 | Alward | 62—228 |
| 2,981,195 | 4/61 | Payne et al. | 200—81.9 |
| 3,121,314 | 2/64 | Koyanagi | 62—243 X |

BERNARD A. GILHEANY, *Primary Examiner.*
ROBERT K. SCHAEFER, *Examiner.*